United States Patent [19]

Sorenson et al.

[11] Patent Number: 4,951,151
[45] Date of Patent: Aug. 21, 1990

[54] IMAGE DISPLAY SYSTEM AND METHOD

[75] Inventors: James L. Sorenson; Alan L. Madsen; Ronald E. Madsen, Jr., all of Salt Lake City, Utah

[73] Assignee: Dawntreader, Inc., Salt Lake City, Utah

[21] Appl. No.: 225,349

[22] Filed: Jul. 28, 1988

[51] Int. Cl.⁵ .................... H04N 5/74; H04N 13/00; H04N 9/31
[52] U.S. Cl. .................................. 358/231; 358/60; 358/88; 434/150; 353/28
[58] Field of Search ............... 358/60, 231, 88, 104; 434/132, 150, 152, 153; 355/18, 22, 44, 52, 59; 352/90; 353/28, 30, 94

[56] References Cited

U.S. PATENT DOCUMENTS

| | | | |
|---|---|---|---|
| 2,309,752 | 2/1943 | Cooke | 434/150 |
| 3,188,911 | 6/1965 | Eisenberg et al. | 434/152 |
| 3,391,601 | 7/1968 | Santandrea et al. | 353/28 |
| 3,707,115 | 12/1972 | Rush | 353/28 |
| 4,076,398 | 2/1978 | Galbraith | 353/28 |
| 4,148,580 | 4/1979 | Hill, Sr. | 434/152 |
| 4,414,565 | 11/1983 | Shanks | 358/231 |

*Primary Examiner*—John K. Peng
*Attorney, Agent, or Firm*—Trask, Britt & Rossa

[57] ABSTRACT

Computer operated projectors are positioned to project onto an uneven surface or relief map prepared to reflect a remote surface. If the remote surface is geographical, the surface is at a scale in which the horizontal scale is substantially larger than the vertical scale. A sound system provides surround sound. A second substrate or movie screen and projector are positioned to provide related video images.

22 Claims, 7 Drawing Sheets

IMAGE DISPLAY SYSTEM AND METHOD

BACKGROUND OF THE INVENTION

1. Field:

This invention relates to systems and methods for projecting images onto substrates. More particularly, the invention involves systems and methods for projecting images onto uneven surfaces in a preselected scale reflective of a remote surface.

2. State of the Art:

Today a wide variety of apparatus are available for projecting images. For example, slide projectors may be used to project images earlier filmed and processed into slides onto a screen for viewing by a viewer. Similarly, overhead projectors may be used to project images present on pre-prepared transparencies. Further, movie films are widely used in both artistic and educational environments to present what is perceived to be moving images.

All of the above images are generally projected onto what is typically referred to as a movie screen. Movie screens have different surface characteristics, including a lenticular surface, all to enhance the quality of the image perceived. Nevertheless, movie screen surfaces are typically planar or flat surfaces.

Efforts to create stereoscopic or three-dimensional visual images in recent years have typically employed imaging systems in which one or more images are projected onto flat screens or similar flat surfaces. The use of polarized glasses, for example, may be used so that the left eye would perceive a horizontally polarized image, and the right eye would perceive a subsequently projected vertically polarized image. The vertical and horizontal polarized images are projected rapidly in sequence in order to secure what may be viewed or perceived by the viewer as a three-dimensional or stereoscopic image. However, all of these images are nonetheless still projected onto a typical movie screen or similar flat surface.

An imaging system and method for projecting images which are realistically three-dimensional and reflective of a remote surface is needed, particularly in selected situations in which certain remote surfaces are to be examined.

SUMMARY OF THE INVENTION

An image display system of the instant invention includes a first substrate formed to have an uneven surface. The surface or substrate is positioned for observation by a viewer. A video generator means is operable by a user for generating first video image signals selected by the user. A first projector means is interconnected to receive the first video image signals from the video generator means. The first projector means converts the first video image signals into a first projectable video image and is positioned to project the first projectable video image onto the uneven surface.

In one embodiment, the uneven surface is patterned to reflect the topography of a remote surface. The uneven surface may also be formed to have selected physical elevation features of a remote surface in a preselected scale. Most desirably, the first video images have portions thereof selected to register with the selected physical elevation features.

In another embodiment, a second substrate is positioned proximate the first substrate and for simultaneous observation by the viewer. A second projector means is positioned to project second images onto the second substrate. Additionally, the display system may include a sound system for generating audible sound supplied by the video generator means.

In an alternate embodiment, the video generator means includes a video image means operable to supply selected video signals. A computer is connected to the video image means to receive selected video signals and convert them to the first video image signals.

Desirably, the computer means is operable to selectively generate a plurality of video image signals in addition to the first video image signal as selected by the user. Each of the plurality of video image signals is convertible to projectable video image signals by the first projector means for simultaneous projection with the first projectable video image.

It should be noted that the first projection means may include a plurality of projectors, each for projecting a portion of the first video image.

In yet another embodiment, the first projector means is positioned relative to the first substrate to project images thereon in an angle of incidence from about 70 degrees to about 90 degrees. The first substrate may be tilted up to about 30° from a substantially horizontal support surface.

In one variation, the remote surface may be a selected land area, and the uneven surface is then patterned to have its horizontal scale substantially smaller than its vertical scale. More specifically, the horizontal scale is desirably selected to be from about 100 to 1 to about 300 to 1, and preferably 200 to 1. The vertical scale is selected to be from about 40 to 1 to about 80 to 1 and preferably 60 to 1. Most preferably, the uneven surface has a flat or non-reflective white coating.

Methods of projecting images include providing an uneven surface substrate and projecting images thereon which are in registration with selected uneven portions of the substrate.

BRIEF DESCRIPTION OF THE DRAWINGS

In the drawings which illustrate the best mode presently contemplated for carrying out the invention.

DESCRIPTION OF THE ILLUSTRATED EMBODIMENTS

An image display system of the instant invention includes a first substrate 10, video generator means 12, and first projection or projector means 14. The system of FIG. 1 may also include a sound system 16 along with a second substrate 18 and second projector means 20. The sound system 16 includes a plurality of speakers which are here illustrated as speakers 22, 24, 26, 28 and 29.

Figure 1:
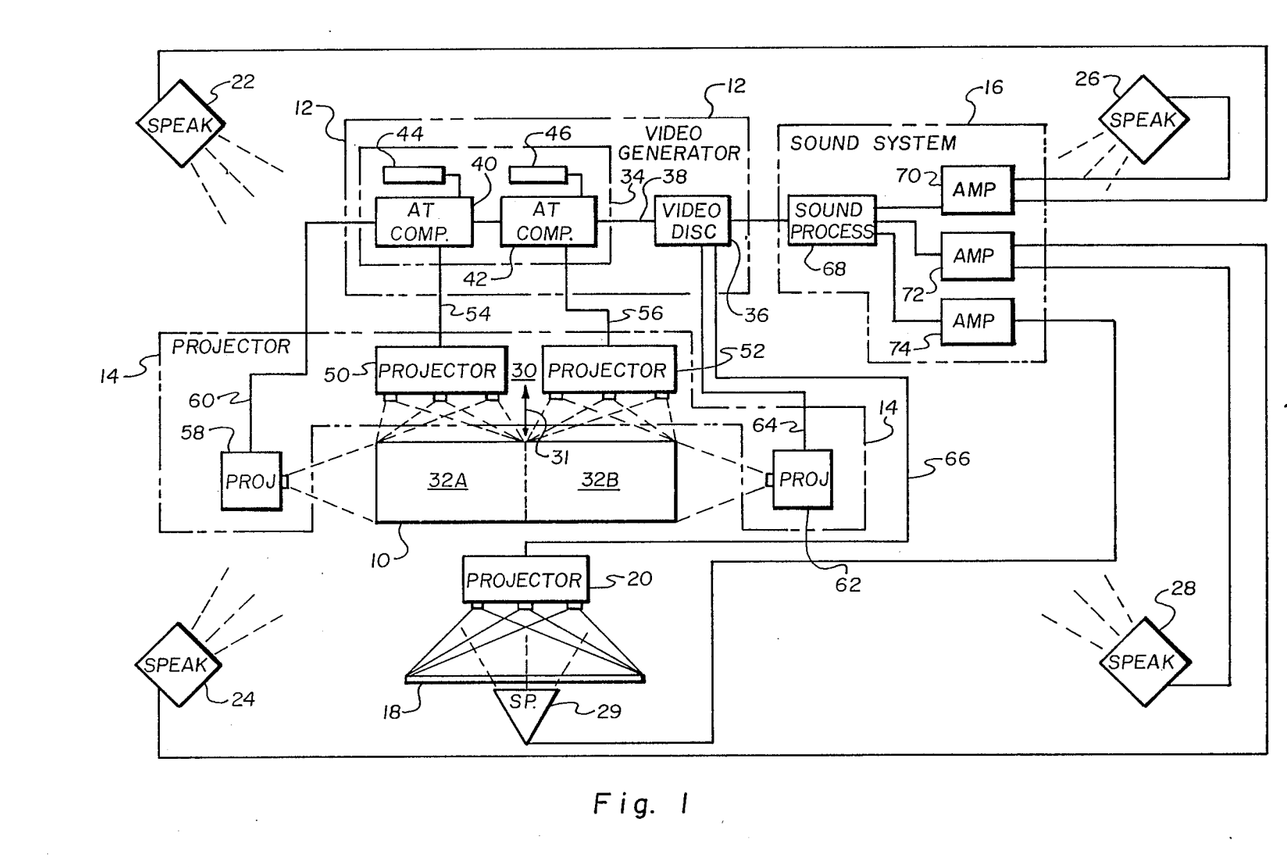
FIG. 1 is a block diagram of an image display system of the instant invention.

First substrate 10 illustrated in FIG. 1 is formed to have an uneven surface with portions 32A and 32B positioned for observation by a viewer. In FIG. 1, the substrate 10 is generally depicted in a top plan view. That is, the substrate 10 is shown to be rectilinear in shape and positioned on a support surface such as a floor. It may be tilted to angle away from the support surface. Thus, a viewer in the position 30 is at a distance 31 horizontally away from the substrate 10 and may be in any orientation to comfortably view the substrate 10 (e.g., sitting or standing), and more particularly the uneven surface portions 32A and 32B of the substrate 10.

The video generator means 12 is any means capable of supplying visible image signals selected by the user. The first projector means 14 is interconnected to the image generator means which is here a video generator means 12 to receive video image signals from the video generator means 12 and to convert them into first projectable video images. The first projector means 14 is positioned to project the projectable video images onto the uneven surface 32A and 32B.

The video generator means 12 is here illustrated to be comprised of computer means 34 and a video disc generator 36.

The video disc generator 36 of this embodiment is interconnected to the computer means 34 via conductor 38 to supply video images. The video disc generator 36 may be any conventional video disc machine or player. In a prototype constructed, the video disc player was a model LDV4200 made by Pioneer. Similar video disc or tape players or machines may be used as desired by the operator. Also, it may be desired to generate laser images so that the projectors are lasers controlled by the computer 34.

The computer means 34 is here shown to be comprised of a first or master computer 40 and a slave computer 42. Each has an input keyboard 44 and 46, respectively.

The computers 40 and 42 selected for use in the video system of the instant invention are what is typically regarded as IBM compatible or IBM clone machines of the AT series. It should be recognized, however, that any acceptable computer capable of issuing video disc signals or processing them for further transmission to projector means 14 as more fully discussed hereinafter will be acceptable.

It should be understood that the video generator means 12 may be comprised of components other than a computer interconnected with a video disc player. For example, certain types of computers may be substitutable for the computer means 34 which are capable of generating digital video signals (or signals to control a laser) internally and in turn generating and supplying the first video image signals to the first projector means 14. Similarly, one may suitably employ a wide variety of different video recorder machines widely available to the consuming public and known as VCR's of the VHS format and VCR's of the Beta format. Those skilled in the art will recognize that a VCR of either format can be interconnected to supply video signals for projection by the projector means 14 in accordance with control signals received from control means which may be a computer such as computer means 34. In other words, combinations of computers and video signal generating means may be used as desired by the user. The output of the video generator means 12 in whatever form selected by the user is a video image signal which is capable of projection by the projector means 14 as a projectable video image.

The projector means 14 is here illustrated in FIG. 1 to include a left main projector 50 and a right main projector 52. Both left and right projectors 50 and 52 are model DP 1200A NEC video projectors. The left projector 50 is interconnected via conductor means 54 to receive video image signals from the master computer 40. Similarly, the right projector 52 is connected via conductor means 56 to receive video image signals from the slave computer 42. The left and right projectors 50 and 52 are shown projecting onto the substrate 32 that has a left half 32A and a right half 32B. Also, each projector 50 and 52 is shown having three separate projection lenses, each projecting a different color so that the images projected onto the substrate 10 are in fact color images.

It should be particularly noted that the left and right projectors 50 and 52 are each projecting separate video images which are desirably correlated to be one half of a total video image which the user desires to project onto the respective substrates to provide a composite image on the substrate, and more particularly on the uneven surface portions 32A and 32B.

As shown in FIG. 1, the projector means 14 is here illustrated to also include a left slide projector 58 interconnected via conductor 60 to the video generator means 12 and a right slide projector 62 interconnected via conductor 64 to the video generator means 12. The left 58 and right 62 slide projectors are positioned physically to project video images onto the left uneven surface portion 32A and the right uneven surface portion 32B, respectively. Both the left 58 and right 62 slide projectors may present a fixed slide image on their respective uneven surfaces 32A and 32B. Alternately, they can receive control signals from the video generator means 12 to cause a plurality of preloaded slides (e.g., in a slide tray) to be projected in a sequential fashion as desired or in coordination with other video images. The projectors selected for the illustrated embodiment may be Kodak model 4200 machines.

FIG. 1 also illustrates a second projector means 20 positioned to project on a second substrate 18. Second projector means 20 and second substrate 18 are shown positioned proximate the first substrate 10 for substantially simultaneous observation by the viewer positioned at the point 30. That is, a viewer at the position 30 would be able to view the substrate 10 and more particularly the uneven surfaces 32A and 32B and either alternate his focus from those particular uneven surface portions 32A and 32B to the second substrate 18 or to have both within his general field of vision. The projector 20 and substrate 18 may be selected to be of the type which provide for rear projection. That is, the substrate 18 is between the viewer and the projector 20.

The second projector means 20 is connected via conductor means 66 to receive video signals from the video generator means 12. In the illustrated embodiment, the video disc player 36 supplies the video signals via conductor 66 to the second projector 20.

The sound system 16 of FIG. 1 includes a sound processor 68 which receives the sound signals from the video disc player 36 to convert them into analog sound signals for further amplification by amplifiers 70, 72 and 74. In a prototype unit, the sound processor was selected to be a model HTS 5000 manufactured by Shure, which is known as a surround audio processor. Amplifiers 70 and 74 were selected to be Hafler 120 amp amplifiers. Amplifier 72 was selected to be a Hafler XL280 amplifier. Speakers 22 and 26 were selected to be JBL 18TI models, and speakers 24 and 28 were selected to be JBL model 120TI. It may be noted that the sound system 16 includes the speakers as well as an additional speaker 29, which has been selected to be a JBL model J320A.

It should be noted that the second substrate 18 may also have an uneven surface. In the prototype system, the second substrate 18 was selected to be a 6 ft. by 8 ft. lenticular wall screen (movie screen) with the projector 20 being selected to be a Harmon-Kardin model UPM 500 video projector.

As noted, the embodiment shown in FIG. 1 employs a master computer 40 and a slave computer 42. A variety of desired and multiple video images may therefore be generated and projected as desired by the user based on the particular program included within each computer 40 and 42. That is, the user may select various programs and load them into the computer, which in turn provides the user with the ability to project multiple and different kinds of images on the respective uneven surface portions 32A and 32B as desired.

For example, in the prototype constructed and depicted in FIG. 1, a paintbrush program was included so that the user may project virtually any kind of image and in turn cause it to move in one of several colors over the uneven surface portions 32A and 32B by use of what is known to those skilled in the art as a computer mouse. A particularly acceptable program used in the prototype was a GRASP version 3.1 program purchased from Paul Mace Software , 400 Williamson Way, Ashland, Oregon 97520. In order to interface the video disc with the particular AT computer selected, additional software was developed which is illustrated in FIGS. 3-7.

Figure 3:
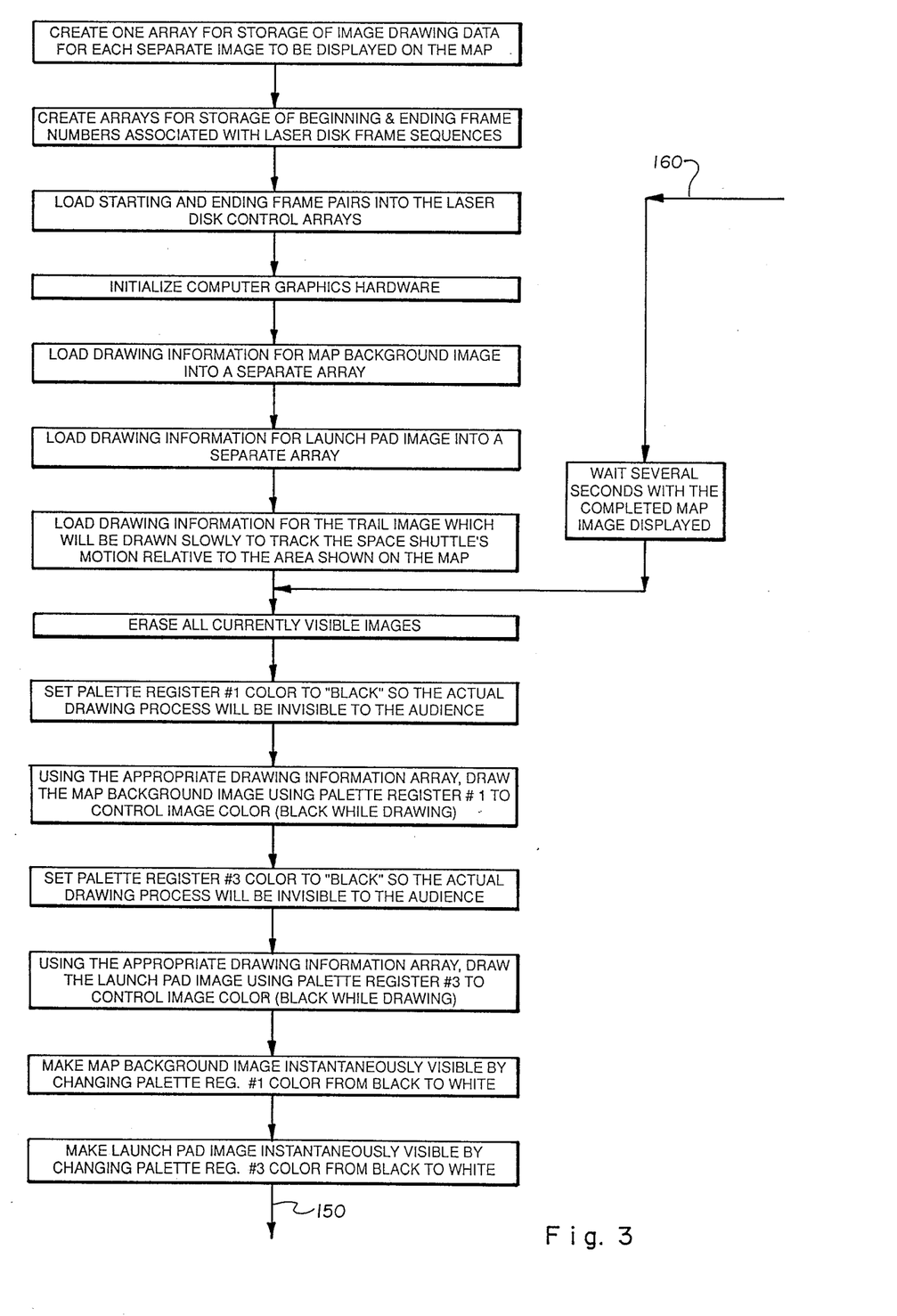
FIGS. 3-7 are a flow diagram of selected interfacing programs used in the embodiment illustrated.
Figure 4:
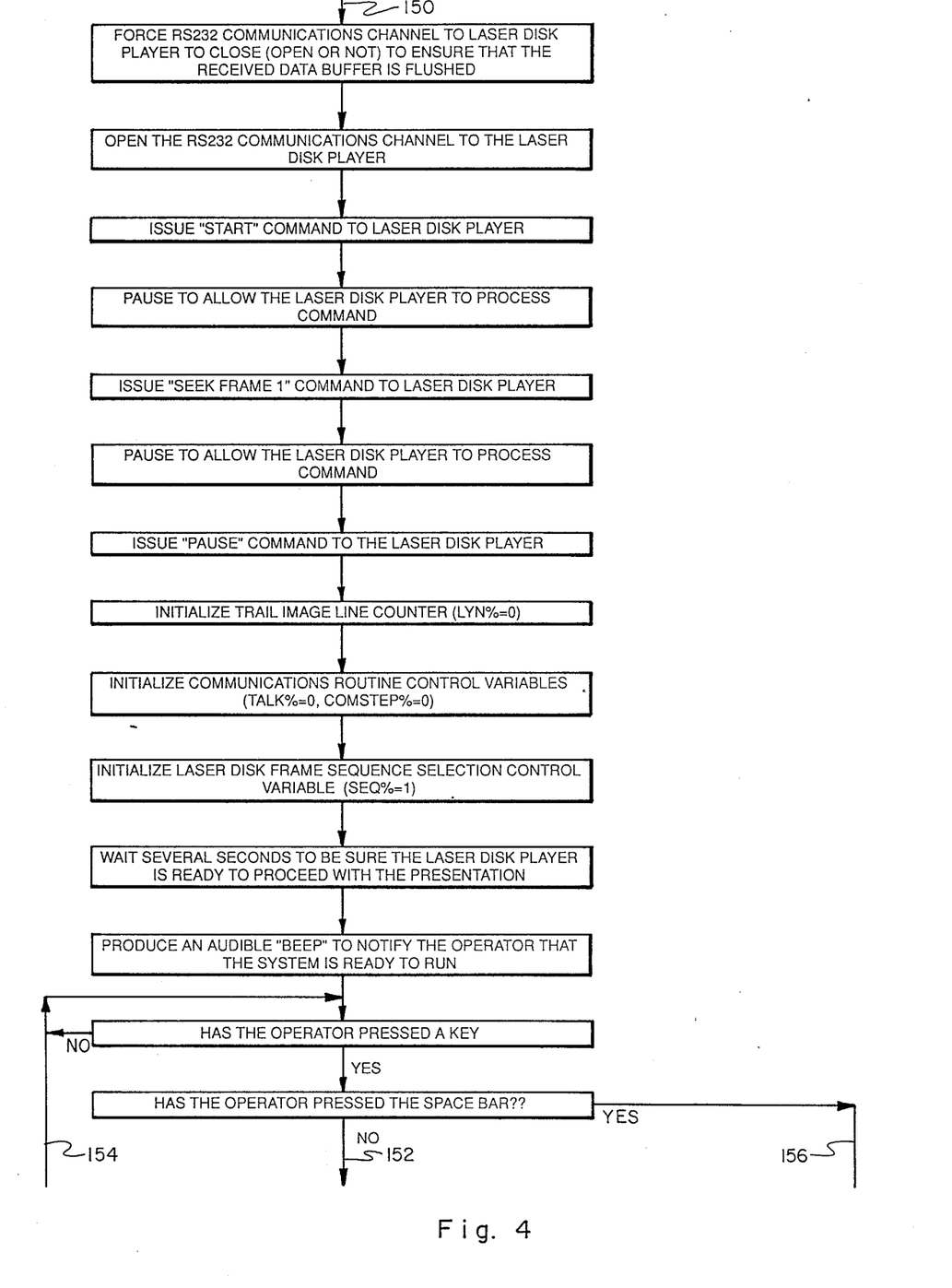
Figure 5:
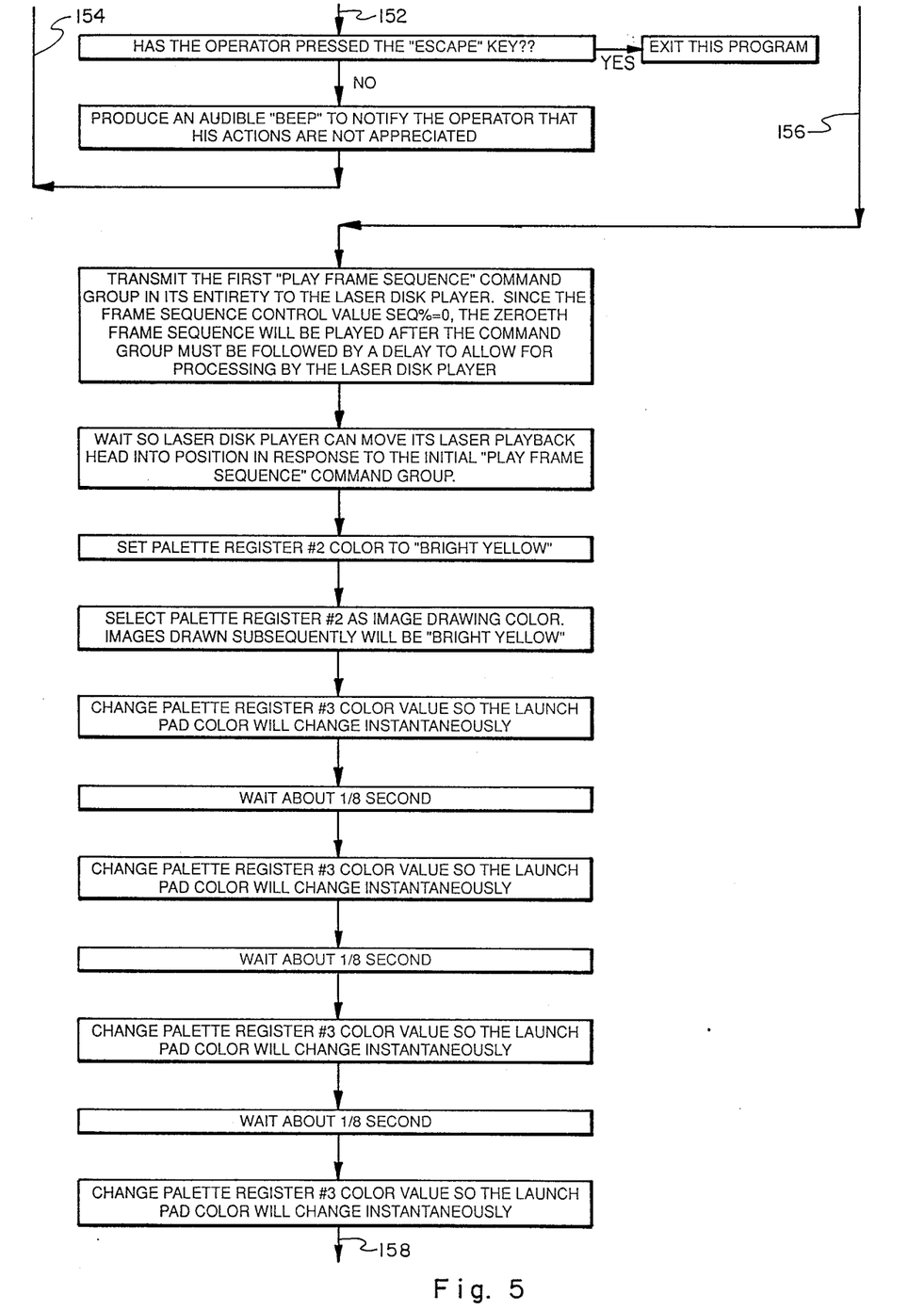
Figure 6:
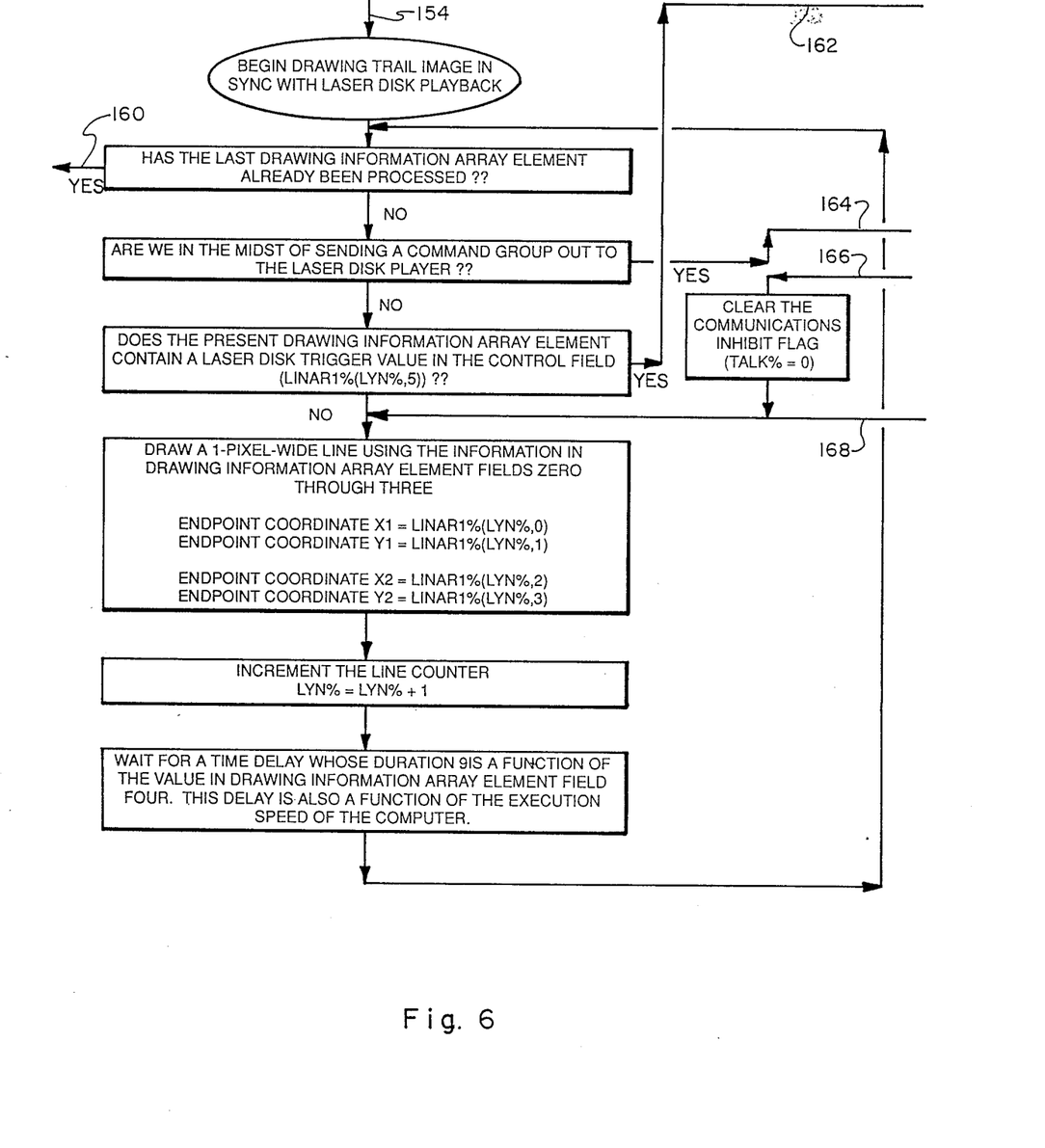
Figure 7:
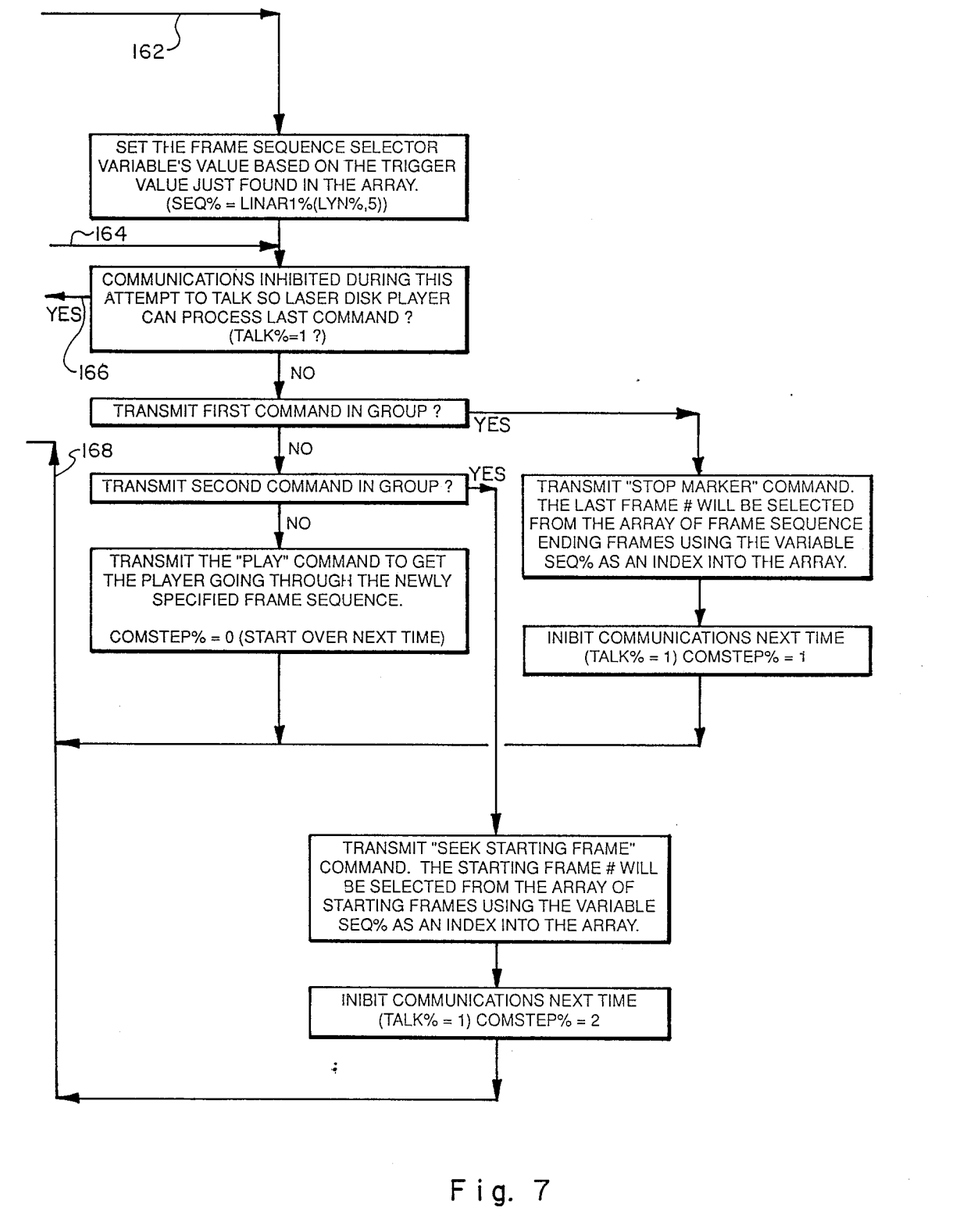

Referring to FIG. 3, the architectural logic flow of the interface software is depicted. FIG. 3 interconnects to the logic of FIG. 4 via line 150 which in turn flows into the logic of FIG. 5 via lines 152, 154 and 156. The logic of FIG. 5 interconnects and flows to the logic of FIG. 6 via line 158. The logic of FIG. 6 interconnects back to FIG. 3 via line 160 and within the logic of FIG. 7 via lines 162, 164, 166 and 168. The architectural logic flow of FIGS. 3-7 reflects a series of stored and inputed computer commands to effect only for illustration the imaging of a rocket launch from Cape Kennedy and to depict a track across the continental United States.

Tables 1 and 2 show a computer program in basic language used for the prototype constructed and usable for the embodiment herein described. Those skilled in the art may readily device other programs and vary the logic of FIGS. 3-7 without deviating from the essence of the teachings of the instant invention.

Figure 2:
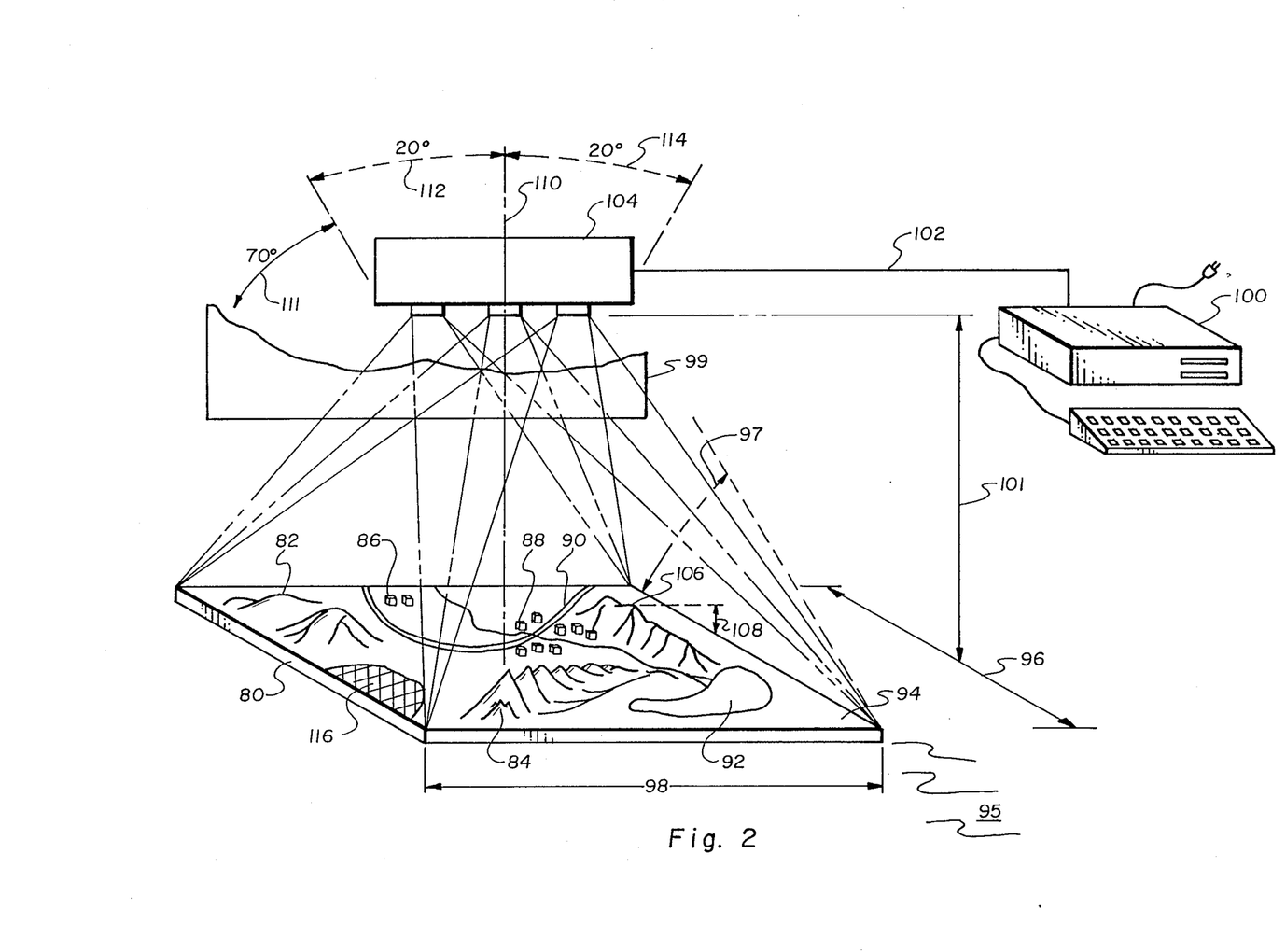
FIG. 2 is a partial perspective representation of portions of an image display system of the instant invention.

Referring to FIG. 2, a substrate 80 is shown, which may be viewed as the first substrate. It is formed to have an uneven surface which here includes portions reflective of a remote surface which is a particular area, region or section of terrain. Thus, the uneven surface has a portion which may be regarded as rolling hills 82 and a mountain range 84 with some small

TABLE 1

```
10 'PROGRAM TITLE: SPACE2.BAS
20 '
30 'PROGRAM FUNCTION: CONTROL OF SPACE SHUTTLE INFORMATION PRESENTATION
40 'ON DAWNTREADER INFOMAP SYSTEM
50 '
60 'WRITTEN: June 18, 1988
70 'AUTHOR: RONALD E. MADSEN, JR.
80 '
90 '================================================
100 DIM LINAR0%(1000,4) '1000 line point sets, 4 coordinates each
110 DIM LINAR1%(2000,6) '2000 lines, 4 coords. each, 1 speed, 1 frame seq select
120 DIM PAD%(11,4) '11 lines, 4 coord. each
130 DIM STRTIM$(20)
140 DIM STOPTIM$(20)
150 '====
160 STRTIM$(1)="36371":STOPTIM$(1)="37294" 'Shuttle launch sequence
170 STRTIM$(2)="32636":STOPTIM$(2)="33855" 'Flight along east coast
180 STRTIM$(3)="46333":STOPTIM$(3)="46578" 'Around Maine
190 STRTIM$(4)="04665":STOPTIM$(4)="05500" 'Over the continent
200 STRTIM$(5)="46538":STOPTIM$(5)="47408" 'Descent
210 STRTIM$(6)="50000":STOPTIM$(6)="51665" 'Landing sequence
220 '====
230 SCREEN 1 'Force reset of graphics hardware
240 SCREEN 9 'Put graphics hardware into EGA mode
250 KEY OFF 'Turn off on-screen legends for special function keys
260 GOTO 1280 'Jump over subroutines
270 '================================================
280 'SUBROUTINE: Open serial communications channel to laser disk player
290 CLOSE #2 'Flush receive buffer if channel was previously open
300 OPEN "COM1:4800,N,8,1,RS,CS0,DS0,CD0" AS #2 'Open coma channel to player
310 PRINT #2,"SA"
320 PLAY "MFP8P63"
330 PRINT #2,"1SE"
340 PLAY "MFP8P63"
350 'PRINT #2,"PA"
360 RETURN
370 '================================================
380 SUBROUTINE: ISSUE COMMANDS TO LASER DISK PLAYER, RELY ON EXTERNAL DELAYS
390 IF TALK%<>0 THEN TALK%=0:RETURN 'Ignore every other call
400 ON COMSTEP% GOTO 460,510 'Determine which command in group is to be sent
410 PRINT #2,STOPTIM$(SEQ%)+"SM" 'Set STOP PLAYBACK MARKER
420 COMSTEP%=COMSTEP%+1 'Send next command next time through
430 TALK%=1 'Inhibit function of next call
440 RETURN
450 '====
460 PRINT #2,STRTIM$(SEQ%)+"SE" 'Search for starting frame
470 COMSTEP%=COMSTEP%+1 'Send next command next time through
480 TALK%=1 'Inhibit function of next call
490 RETURN
```

TABLE 1-continued

```
500  '====
510  PRINT #2,"PL" 'Command player to play at starting frame
520  COMSTEP%=0
530  RETURN
540  '===========================================================
550  'SUBROUTINE: COMMAND THE LASER DISK TO PLAY A SEQUENCE OF FRAMES
560  PRINT #2,STOPTIM$(SEQ%)+"SM" 'Set STOP PLAYBACK MARKER
570  PLAY "MFP7P63" 'time delay
580  PRINT #2,"PA" 'PAUSE playback but do not spin down the disk
590  PLAY "MFP7P63" 'Time delay
600  PRINT #2,STRTIM$(SEQ%)+"SE" 'Search for starting frame
610  PLAY "MFP7P63" 'Time delay
620  PRINT #2,"PL" 'PLAY when search address is reached
630  RETURN
640  '===========================================================
650  'SUBROUTINE: LOAD MAP BACKGROUND IMAGE AND LAUNCH PAD IMAGE
660  OPEN "FLITSG0.DAT" FOR INPUT AS #1
670  LYNUM%=0 'initialize line number
680  IF EDF(1) THEN 780 'stop loading when end of input file is reached
690  '====
700  FOR P%=0 TO 3 'array element field index
710  INPUT #1,LINAR0%(LYNUM%,P%)
720  NEXT P%
730  '====
740  LYNUM%=LYNUM%+1 'proceed to next image line
750  IF LYNUM% < 1000 THEN 680 'make sure we are not out of room
760  '====
770  PRINT "Insufficient array space."
780  LINAR0%(LYNUM%,0) = -1 'Install end of array marker
790  CLOSE #1 'done loading map background image, close the disk file
800  '====
810  OPEN "#PAD.DAT" FOR INPUT AS #1
```

TABLE 2

```
820  FOR LYNUM%=0 TO 10
830  '====
840  FOR P%=0 TO 3 'array element field index
850  INPUT #1,PAD%(LYNUM%,P%)
860  NEXT P%
870  '====
880  NEXT LYNUM% 'proceed to next image line
890  CLOSE #1 'done loading launch pad image, close the disk file
900  RETURN
910  '===========================================================
920  'SUBROUTINE: DISPLAY MAP BACKGROUND IMAGE
930  PALETTE 1,0 'Use palette register 1 to control image color (black now)
940  COLOR 1
950  LYN% = 0
960  IF LINAR0%(LYN%,0) < 0 THEN 1020 'Look for end of array marker
970  IF LYN% >= 1001 THEN 1020 'Check for absolute end of array
980  LINE(LINAR0%(LYN%,0),LINAR0%(LYN%,1))-(LINAR0%(LYN%,2),LINAR0%(LYN%,3))
990  LYN%=LYN%+1
1000 GOTO 960 'Do next line
1010 '====
1020 PALETTE 3,0 'Set launch pad drawing color to black
1030 COLOR 3 'Now draw the launch pad in color number 3 (black)
1040 FOR LYN%=0 TO 10
1050 LINE (PAD%(LYN%,0),PAD%(LYN%,1))-(PAD%(LYN%,2),PAD%(LYN%,3))
1060 NEXT LYN%
1070 PALETTE 3,63 'Temporarily set launch pad color to white
1080 PALETTE 1,63 'Turn rest of the background image on (white)
1090 RETURN
1100 '===========================================================
1110 'SUBROUTINE: LOAD LINAR1 ARRAY
1120 OPEN "#FLITSG1.DAT" FOR INPUT AS #1 'Trail image drawing information file
1130 LYNUM%=0
1140 IF EDF(1) THEN 1240
1150 '====
1160 FOR P%=0 TO 5
1170 INPUT #1,LINAR1%(LYNUM%,P%)
1180 NEXT P%
1190 '====
1200 LYNUM%=LYNUM%+1
1210 IF LYNUM% < 2000 THEN 1140
1220 '====
1230 PRINT "Insufficient array space."
1240 CLOSE #1
1250 LINAR1%(LYNUM%,0) = -1 'End of array marker
1260 RETURN
1270 '===========================================================
```

TABLE 2-continued

```
1280  GOSUB 660 'Load LINAR0 array data (map background image)
1290  GOSUB 1120 'Load LINAR1 array data
1300  '====
1310  CLS 'Clear any old graphics off the screen
1320  GOSUB 930 'Display map background image and launch pad image
1330  GOSUB 290 'Close, open serial communications channel to laser disk player
1340  LYN% = 0 'Initialize trail image line counter
1350  TALK%=0 'Set communications subroutine function inhibit flag to OFF state
1360  COMSTEP%=0 'Initialize command group command selector variable
1370  SEQ%=1 'Initialize laser disk frame sequence selector
1380  '====
1390  PLAY "MFP1P1P1P1P63":SOUND 400,1 'Wait for disk player, then beep
1400  A$=INKEY$:IF A$="""THEN 1400 'Wait for a key
1410  IF A$="" THEN 1450 'Start the presentation if SPACE is pressed
1420  IF A$=CHR$(27) THEN SYSTEM 'Exit if Esc is pressed
1430  SOUND 2400,1:GOTO 1400 'Complain if neither SPACE nor Esc is pressed
1440  '====
1450  GOSUB 560 'Transmit complete command sequence to laser disk player
1460  PAY "MFP1P63" 'Wait for laser disk head to move into position
1470  '====
1480  COLOR 2 'Use palette register 2 to draw trail image
1490  PALETTE 2,54 'Set palette register 2 to color 54 (yellow)
1500  '====
1510  PALETTE 3,52:PLAY "MFP8P63" 'Switch launch pad color to ORANGE, wait
1520  PALETTE 3,4:PLAY "MFP8P63" 'Switch launch pad color to RED, wait
1530  PALETTE 3,54:PLAY "MFP8P63" 'Switch launch pad color to YELLOW, wait
1540  PALETTE 3,63 'Switch launch pad color to WHITE
1550  IF LINAR1%(LYN%,0) < 0 THEN 1630 'Look for end of array marker
1560  IF COMSTEP%>0 THEN GOSUB 390 'Complete any pending communications
1570  IF LINAR1%(LYN%,5)>0 THEN SEQ%=LINAR1%(LYN%,5):GOSUB 390 'Command 1disk
1580  LINE(LINAR1%(LYN%,0),LINAR1%(LYN%,1))-(LINAR1%(LYN%,2),LINAR1%(LYN%,3))
1590  LYN%=LYN%+1
1600  FOR JJ% = 0 TO LINAR1%(LYN%,4):NEXT JJ% 'Execute delay between image lines
1610  GOTO 1550 'Do next line
1620  '====
1630  PLAY "MFP1P1P1P1P1P1P1P1P1P1P1P1P1P1P1P1P1P1P63" 'Just wait awhile
1640  GOTO 1310 'Get ready to run the show again
``` buildings 86. A small town or city 88 with an interstate highway 90 and a small lake 92 are also shown. The substrate 80 is selected to have an uneven surface 94 reflecting the topographical features as noted. The substrate 80 is here shown to be essentially or substantially horizontal and residing on a support surface 95 such as a floor. The substrate 80 may be tilted or elevated on one end to as much as about 30 degrees 97 to enhance the view of the observer at position 30 (FIG. 1) with the substrate 80 tilted. The second substrate or screen 99 may be positioned proximate thereto so that the viewer may easily have both substrate 94 and 99 easily in view to enhance perception, experience and enjoyment.

The length 96 and width 98 of the substrate 80 is selected to a particular scale. That is, the scale is chosen to reflect the remote surface. In FIG. 2, geographic topography is being represented in a horizontal scale which is selected to be smaller than the vertical scale. In the prototype, the scale was 200 to 1. This scale may vary significantly but, for geographic presentation, is desirably within a range from about 100 to 1 to about 300 to 1. In other applications, the user could select any scale desired including even an enlargement so that the surface 94 would be an enlargement of a remote surface. For example, the images projected could be those of a patient for instructing prospective surgeons regarding particular techniques in which a portion of the body would be enlarged many fold to facilitate observation.

However, in FIG. 2 the illustration is geographical in character in which the particular scale selected is a reduction rather than an enlargement as hereinbefore described. The length 96 may be selected as desired, but is here illustrated to be approximately 6 to 8 feet. The width 98 is selected here to be approximately 8 feet but may be any convenient dimension selected by the user.

In FIG. 2, computer 100 supplies a video image signal via conductors 102 to a projector 103, which in turn is projecting images onto the substrate 80 and more particularly the uneven surface 94. The substrate 80 is formed to have the uneven surface 94 reflective of topographical features of the remote surface as noted hereinbefore. For example, mountains 106 have an elevation or height 108 which is selected at a particular scale desired by the user. For geographic topography, the scale may range from approximately 40 to 1 to 80 to 1. Desirably, the scale is approximately 60 to 1 when the horizontal scale or the length 96 and width 98 is selected to be about 200 to 1. It should be recognized that in selected applications, the vertical scale may also be 1 to 1 or even in magnification for reasons as discussed with respect to the horizontal scale.

In order to project video images of remote surfaces with specific geographic features such as mountains 84, mountains 106, hills 82, and the like, appropriate video images are recorded of the remote topography by airplanes, satellites or similar means. The images are then digitized and processed in the computer 100 to a scale so that selected portions of the video image will register at a given focal length 101 with similar geographical physical elevation features of the remote surface such as depicted in FIG. 2. That is, the video image being projected by projector 104 correlates specifically with and is in registry with the physical features of the uneven surface 94, and in particular the mountains 84 and 106, hills 104, and buildings 86 and 88. Thus, the snow cap of mountains appears on the mountains 84 as they do in actuality. Similarly, water would be depicted (by appropriate color or shade) in registry with the lake 92.

It should be noted that the projector 103 must be positioned to have a particular angle with respect to the substrate 94. As here illustrated, the substrate 94 generally is a flat substrate with elevational features to create the uneven surface 94, which is nonetheless generally planar. It may be regarded to be in the form of a relief map. Projector 104 is positioned with respect to the substrate 80 to project directly thereto. In FIG. 2, the projector is shown positioned above what is generally horizontal substrate 80. It should be recognized, however, that the substrate 80 could be positioned in any convenient orientation, including upright or vertical, against the wall. Desirably, it is tilted as hereinbefore described.

The projector 104 is positioned to be normal to the substrate 80. That is, the angle of incidence between a central projection axis 110 is preferably directly on the substrate 80 or at a slight variation not to exceed approximately 20 degrees 112. That is, projector 104 may be positioned directly above to be normal as illustrated in FIG. 2 or at an angle 112 approximately 20 degrees from the normal 110 so that the angle of incidence 111 may be said to be 70 degrees as measured from the plane of the substrate 80. It may be noted that the projector 104 may be positioned under the substrate similar in orientation to that of FIG. 2 with the substrate 94 material selected appropriately to permit projection from underneath.

It should be noted that use of a variety of different computer programs as discussed hereinbefore, and in particular a paintbrush program, can be used to develop a number of different video signals, each which can be projected sequentially or simultaneously on the uneven surface 94. For example, a video signal can be generated such as illustrated in FIG. 2 at 116 which is reflective of, for example, an ancient invading army or a plague of insects moving into a particular region. Objects can be caused to move on a representative highway such as the highway 90 in FIG. 2. Lake levels in the lake 92 can be changed with the seasons using sequential video images. Thus, a wide variety of information or data can be depicted on the uneven surface 94. Information such as wildlife population, human population, or the like may be all graphically depicted.

Significant other data or a correlated video image may be projected on the second substrate 18 if desired. For example, in one practical embodiment, systems such as that in FIG. 1 had a topography of a particular geographical area illustrated by the projectors 50 and 52 on the uneven surfaces 32A and 32B. A missile firing is depicted using conventional filming techniques by projector 20 onto the second substrate 18 while at the same time the corresponding geographical track or flight path of the missile over the terrain was depicted on the uneven surfaces 32A and 32B. That is, the line of flight is depicted over the particular terrain involved.

As noted hereinbefore, a wide variety of video images may be depicted. For example, it may be quite desired to project the geography of particular regions and in turn depict various climatological, ecological, entomological, and hydrological features pertinent to that particular segment. In another context, portions of the human body can be depicted with surgical procedures being sequentially depicted on substrates. In yet another context, molecular structures and chemical reactions can be depicted.

It may be noted that a substrate such as substrate 80 with uneven surface 94 may be useful for more than one remote area. Notably, particular mountains 84 and 106 and hills 82 are unique to a particular region. However, another area may be projected onto the substrate. The particular vertical scale (60 to 1) provides just enough undulation to the surface 94 to provide a sense of realism not otherwise experienced when projecting onto a flat surface such as the second substrate or lenticular movie screen 18. Thus, mild undulation may be used which do not correlate to any particular topography but nonetheless provide an enhanced image which is perceived to be in relief or three dimensional.

Those skilled in the art will recognize that other multiple video images can be used to produce a wide variety of perceived educational programs employing the first substrate 10 and the second substrate 18 in their respective projector means.

It should be further understood that the embodiments of the instant invention are not intended to limit the scope of the claims which themselves recite those features regarded as essential to the invention.

What is claimed is:

1. An image display system comprising:
a first substrate formed to have an uneven surface positioned for observation by a viewer, said uneven surface being scaled to reflect the topography of a remote surface and said uneven surface having a planar preselected scale and selected physical elevation features of said remote surface in a preselected scale different from said planar preselected scale;
video generator means operable by a user for generating first video image signals selected by the user;
first projector means interconnected to receive said first video image signals from said video generator means for converting them into first projectable video images, said first projector means being positioned to project said first projectable video images onto said uneven surface.

2. The image display system of claim 1 wherein said first video images have portions thereof selected to register with said selected physical elevation features.

3. The image display system of claim 1 further including a second substrate positioned proximate said first substrate and for substantially simultaneous observation by the viewer, and further including second projector means positioned to project second images on said second substrate, wherein said video generator means generates second selected image signals and supplies them to said second projector means which receives said second image signals and converts them to said second images.

4. The image display system of claim 3 further including a sound system for generating audible sound, and wherein said video generator means is connected to said sound system to supply a sound signal to said sound system for generating said audible sound.

5. The image display system of claim 4 wherein said first video images, said second images and said audible signals are generated substantially simultaneously in a coordinated program selected by the user.

6. The image display system of claim 1 wherein said remote surface is a selected land area and wherein said uneven surface is patterned to have its horizontal scale substantially smaller than its vertical scale.

7. The image display system of claim 6 wherein said horizontal scale is from about 100:1 to about 300:1 and wherein said vertical scale is from about 40:1 to about 80:1.

8. The image display system of claim 6 wherein said substrate has a non-reflective white surface.

9. An image display apparats comprising:

a substrate formed to have an uneven surface patterned to reflect the physical elevation features of a remote surface in a first preselected scale and the planar features of said remote surface in a second preselected scale different from said first preselected scale;

projection means positioned to project images of said remote surface onto said substrate with preselected portions of said images correlated to the said physical elevation features of said remote surface.

10. The image display apparatus of claim 9 wherein said projection means is positioned to project said images to be substantially in the same second preselected scale as observed on the said substrate.

11. The image display apparatus of claim 10 wherein said projection means is positioned with respect to said first substrate to project said images thereon at an angle of incidence from about 70 degrees to about 90 and wherein said first substrate is positioned to be substantially parallel to an angle of about 30 degrees relative to a supporting floor surface.

12. The image display apparatus of claim 11 wherein said remote surface is a land area, wherein said preselected scale has a horizontal scale substantially smaller than its vertical scale.

13. The image display apparatus of claim 12 wherein said second preselected scale is about 150:1 to about 250:1 and said first preselected scale is from about 40:1 to about 80:1.

14. A method of projecting video images, said method comprising:
providing a raised relief substrate in planar scale with physical elevational features reflective of the physical elevational features of a remote surface in a vertical scale different from said planar scale; and
projecting a first video image of said remote surface onto said raised relief substrate with the physical elevational features of said remote surface of said first video image in substantial registry with the physical elevational features of said raised relief substrate.

15. The method of claim 14 further including the simultaneous projection of additional video images onto said raised relief substrate in registry with the physical elevational features of said raised relief substrate to reflect other information selected by the user.

16. A method of displaying three dimensional map images, said method comprising:
forming a raised relief substrate with elevational features reflective of a selected geographical area with a vertical scale different from its planar scale;
projecting onto said raised relief substrate images of said selected geographical area with the elevational features of said selected geographical area in registry with the elevational features of said raised relief substrate.

17. An image display system comprising:
a first substrate formed to have an uneven surface positioned for observation by a viewer;
video generator means operable by a user for generating first video image signals selected by the user, said video generator means including, video image means operable to supply selected video signals, and
computer means connected to said video image means to receive selected video signals and to convert them to said first video image signals, said computer means being operable to process said selected video signals in accordance with predetermined instruction; and
first projector means interconnected to receive said first video image signals from said video generator means for converting them into first projectable video images, said first projector means being positioned to project said first projectable video images onto said uneven surface.

18. The image display system of claim 17 wherein said computer means includes means to selectively generate a plurality of video image signals in addition to said first video image signal as selected by the user, each convertible to projectable video images by said first projector means for simultaneous projection with said first projectable video image by said first projector means.

19. The image display system of claim 18 wherein said first projection means includes a plurality of projectors each projecting a portion of said first video image.

20. The image display system of claim 19 wherein said first projector means is positioned relative to said first substrate to project images thereon at an angle of incidence from about 70 degrees to about 90 degrees and wherein said first substrate is positioned relative to the horizontal substantially parallel thereto to an angle of about 30 degrees therefrom.

21. An image display system comprising:
a first substrate formed to have an uneven surface positioned for observation by a viewer;
video generator means operable by a user for generating first video image signals selected by the user;
first projector means interconnected to receive said first video image signals form said video generator means for converting them into first projectable video images, said first projector means being positioned to project said first projectable video images onto said uneven surface, said first substrate to project images thereon at an angle of incidence from about 70 degrees to about 90 degrees.

22. An image display apparatus comprising:
a substrate formed to have an uneven surface patterned to reflect the physical elevation features of a remote surface in a preselected scale, said substrate being formed in a horizontal scale; and
projection means positioned to project images of said remote surface onto said substrate with preselected portions of said images correlated to the said physical elevation features of said remote surface, said projection means is positioned to project said images to be substantially the same horizontal scale as observed on the said substrate, said projection means being positioned with respect to said first substrate to project said images thereon at an angle of incidence from about 70 degrees to about 90 degrees, and said first substrate being positioned to be substantially parallel to an angle of about 30 degrees relative to supporting surface.

* * * * *